United States Patent Office 3,399,513
Patented Sept. 3, 1968

3,399,513
COATED CUPROUS HALIDE SORBENTS AND A METHOD FOR SORBING LIGANDS
William Thomas House, Marnell Albin Segura, and William Lambert Senn, Jr., Baton Rouge, and Gerald Albert Byars, Denham Springs, La., assignors to Esso Research and Engineering Company, a corporation of Delaware
No Drawing. Filed Dec. 24, 1964, Ser. No. 421,074
10 Claims. (Cl. 55—74)

This invention is directed to a method for preparing active cuprous halide sorbents having improved physical properties, the sorbents thus formed, and the use of these sorbents to sorb selectively ligands from ligand-containing streams. More specifically, the present invention is directed to the formation of strong, thin, porous, solid polymeric films on the exterior surface of solid, porus active cuprous halide sorbents by a method essentially involving depositing the liquid polymeric coating on the exterior surface of previous complexed cuprous halide particles and then simultaneously emitting a fluid from said particles in conjunction with the decomplexation thereof while the coating is being solidified. Usually most of the fluid emitted from the cuprous halide complex particles is the gaseous complexing agent, e.g., gaseous butadiene, with the remainder being the carrier solvent for the polymeric film. Hence, the present invention involves a simultaneous decomplexing of the cuprous halide complex particles and curing (solidification) of the polymeric coating. The butadiene complexing agent as it emanates from the sorbent during decomplexing creates tiny, fairly uniform voids in the solidifying polymeric film, thus rendering said film sufficiently porous to allow use of the sorbent over repeated ligand sorption-desorption cycles covering extended time periods in a given olefin recovery operation. The term "simultaneously" as used herein with respect to decomplexation and curing means that the decomplexation is accomplished at some time during the curing (solidification) of the polymeric film, the curing usually requiring a longer time period than the decomplexing.

Solid cuprous halide particles, such as those used to separate conjugated diolefins from hydrocarbon streams containing them, are subject to loss of physical strength and formation of fines during use over repeated sorption-desorption cycles, especially when used in a fluidized bed system of olefin separation and recovery. The breakdown of the larger size particles to fines adversely affects their fluidization properties and causes loss of active sorbent solids.

We have discovered that active, friable, solid sorbent particles of cuprous halide having improved attrition resistance, fluidization properties, and other improved physical properties rendering said sorbent particles eminently useful for olefin separation can be produced by depositing a polymeric film on the exterior surface of the cuprous halide sorbent particles (which have already been complexed with a complexing agent, which vaporizes somewhere within the temperature range over which the polymer coating is cured) followed by simultaneous decomplexation of the cuprous halide sorbent and curing of the polymeric coating. This insures that the requisite decomplexation is accomplished as the coating is being cured, imparting the desired porosity to the coating, thereby allowing ready ingress and egress of the gases being separated when the activated coated cuprous halide sorbents are used later to selectively sorb monoolefins, diolefins, etc., from hydrocarbon streams.

The polymer film applied to the exterior surfaces of the previously complexed cuprous halide sorbent particles should have the following characteristics: (1) the coating must be sufficiently porous to permit sorption-desorption to be conducted readily; (2) the coating must enhance the attrition resistance of the sorbent particles so that the coated sorbent has an attrition resistance greater than that of the uncoated cuprous halide sorbent particles; (3) the coating material should solidify to form a tough, durable, self-supporting film at temperatures below approximately 200° F., to avoid thermal damage to the active cuprous halide particles; (4) the porosity of the coating must be sufficient to permit passage of the complexing ligands, such as butadiene, which complex with the sorbents, but must be sufficiently low to prevent egress of cuprous halide sorbent particles or subparticles whose size is normally less than 40 microns. Usually the average pore size of pores in the polymeric film is less than 20 microns and preferably less than 10 microns; (5) the coating material in the uncured (solution or dispersion) stage, must be soluble or readily dispersible in a solvent and/or dispersing carrier which is chemically inert to and does not deleteriously affect the cuprous halide sorbent particles; (6) the polymeric film when cured should have an average film thickness ranging from about 10–600 A., usually from about 20–400 A., and preferably from about 40–200 A.; and (7) the polymeric film in the cured state must be chemically inert to (free from attack by) light hydrocarbons present in the feedstock also containing the olefin or diolefin to be stored. The coated cuprous halide sorbents contain as a surface coating from about ½ to about 30 wt. percent of the polymeric film (based on the weight of the cuprous halide sorbent), usually from 1.5 to 20 wt. percent, and preferably about 3 to 10 wt. percent. The specific preferred wt. percent of deposited film will vary depending upon the specific polymer used to form the film.

A wide variety of organic polymers can be employed to form the polymeric films employed in accordance with this invention. Exemplary organic polymers which can be used include, but are not limited to, the following: polybutadiene homopolymers and copolymers, e.g., polybutadienes, oxidized polybutadienes, hydroformylated polybutadienes, etc., having a molecular weight (number average) ranging from 500 to 6000 and copolymers of butadiene with other polymerizable monomers, e.g. styrene, acrylonitrile, leading to the formation of solvent-soluble copolymers capable of curing at the temperatures below 200° F. with or without extraneous curing agents (i.e., extraneous to the polymer) such as butadiene-styrene, butadiene-acrylonitrile, etc.; polyurethane polymers, such as those formed by the reaction of various aromatic diisocyanates, e.g., tolylene diisocyanate, bitolylene diisocyanate, diphenyl methane diisocyanate, etc., with hydroxyl group containing materials, e.g. modified linseed oil, castor oil, polyols, polyesters and polyethers which can contain an amine, lead naphthenate or cobalt naphthenate or other suitable curing agent in minor amounts; silicone polymers such as mono or polyalkyl silicone and siloxane resins, including those formed in situ using polymerizable, e.g., unsaturated halosilanes or readily polymerizable silanols; alkyd resins, such as the condensation product of a polyol, an acid anhydride, and a fatty acid; epoxy resins, such as the condensation products of epihalohydrins, e.g., epichlorhydrin, with a dihydric phenol; polyester resins, including the condensation products of polybasic saturated or unsaturated organic acids or anhydrides thereof, e.g., fumaric acid, maleic anhydride, phthalic anhydride, isophthalic acid, adipic acid, azelaic acid, etc., with saturated or unsaturated polyhydroxy alcohols, e.g., ethylene glycol, propylene glycol, 1,3-butylene glycol, 2,3-butylene glycol, diethylene glycol, dipropylene glycol, etc.; various high molecular weight cellulose and nitro cellulose polymers, e.g., cellulose and nitrocellulose polymers having molecular weights between about 10,000 to 300,000; and other film forming polymers that cure at low temperatures, i.e. $<200°$ F. Various mixtures of any two or more of the abovementioned polymers dissolved or dispersed in a common solvent or dispersion medium can likewise be employed.

The specific solvent and/or dispersion medium employed to dissolve the curable polymer will depend upon the particular polymer coating being deposited. For example, suitable solvents for polybutadienes, butadiene-styrene and butadiene-acrylonitrile copolymers and/or terpolymers, polyurethane polymers, silicone polymers epoxy polymers, and polyester polymers include, but are not limited to, the following: $C_4$ to $C_{10}$ n-alkanes, e.g., n-butane, n-pentane, n-hexane, n-heptane, n-octane, n-nonane, n-decane; $C_2$ to $C_{12}$ di-lower alkyl ketones, i.e., dialkyl ketones in which each alkyl constituent has from 1 to 6 carbon atoms, e.g., acetone, methyl isobutyl ketone, diethyl ketone, methyl ethyl ketone, etc. In addition to solvent carriers, the polymers can be dispersed in aqueous or non-aqueous dispersion mediums.

The concentration of polymer dissolved and/or dispersed in the solvent and/or dispersion medium can range from about 0.5 to 50 wt. percent (based on total polymer solution or dispersion), usually ranges from about 1 to 40 wt. percent and preferably ranges from about 2 to 25 wt. percent. These coating solutions can contain dissolved or dispersed therein varying amounts of curing agents which are capable of curing the polymer contained in the solution and/or despersion at temperatures below about 200° F. Suitable exemplary curing (crosslinking) agents which can be employed include, but are not limited to, the following: organic diisocyanates, e.g., tolylene diisocyanate; organic and inorganic peroxides and hydroperoxides, e.g. benzoyl peroxide, di-tert-butyl peroxide, cumene hydroperoxide, sodium peroxide; difunctional aromatics, e.g. divinyl benzene; alkylene mono or polyamines, e.g., ethylene diamine, hexamethylene diamine, hexamethylene pentamine, etc. The specific curing agent employed will vary according to the type of polymer employed in the coating formulation. While varying amounts of curing agent can be present, generally the concentration of curing agent in the solution and/or dispersion based on polymer content ranges from about 0.1 to 5.0 wt. percent, and more usually from 0.1 to 1.0 wt. percent.

The usual formulation procedures can be employed to form the polymer solutions or dispersions. Usually the solutions are formed by dissolving the desired polymer in the solvent at temperatures ranging from about $-30$ to 100° F. accompanied by sufficient agitation to insure substantially complete dissolving (or dispersing) of the selected polymer within a reasonable period of time. The curing agent can then be added to the solution or dispersion if not incorporated in the polymer (or added previously) using mild agitation. Then various typical methods of applications of the polymer coating on to the previously complexed cuprous halide sorbent particles can be employed. Thus the polymer solution can be deposited on to the previously complexed cuprous halide sorbent particles by application of the polymer solution in a fluidized bed, in a coating pan, or by slurrying the previously complexed cuprous halide sorbent particles with a solution of the coating material in the volatile solvent followed by evaporation of the solvent.

As noted hereinabove, the cuprous halide particles are complexed with a suitable complexing agent prior to being coated in accordance with this invention. These cuprous halide-ligand complexes are formed in essentially two stages. The first stage inovlves dissolving the cuprous halide salt in a suitable organic or inorganic solvent, e.g., $C_4$ to $C_9$ olefins, esp. $C_4$ to $C_9$ mono 1-olefins, followed by filtration to remove undissolved residue. The dissolving step usually takes place at temperatures ranging from about $-50$ to about 50° F. and is accomplished by adding the salt to the solvent with agitation, e.g., stirring to aid in dissolving the cuprous halide salt. Conventional glass fiber or other filters customarily employed to remove solids from liquids can be employed to clarify the cuprous halide solution by removal of undissolved salts and other insoluble residue therefrom.

While maintaining the clarified cuprous halide solution within the aforementioned dissolving temperature ranges, the complexing agent is contacted therewith at complexing temperatures of about $-50$ to about 50° F., at pressures ranging from about 0 to 50 p.s.i.g., for time periods of about 30 to 240 minutes.

Suitable complexing agents for use in the complexing step (complexing ligands) are those compounds capable of forming stable cuprous halide complexes having a mole ratio of copper to complexing compound greater than 1:1 and preferably 2:1 or higher. The term "ligand" as employed herein with regard to the complexing step is intended to denote the presence of a compound containing a functional group capable of forming stable copper complexes having a mole ratio of copper to complexing compound greater than 1:1 and preferably 2:1 or higher. Such compounds include both materials which form only complexes having said ratios of copper to complexing compound, and compounds which form complexes having a ratio of 1:1 or less, which upon decomplexing, pass through a stable complex having the ratio of copper to complexing compound greater than 1:1. Thus, certain materials, e.g., nitriles, diolefins, acetylenes, carbon monoxide, etc., under ordinary conditions forming a 2:1 complex can be made to complex in ratios of copper to complexing compound of 1:1 or less. However, upon dissociation, complexing material is released selectively from the bed of cuprous halide until the stable complex, viz., the complex having a copper to complexing moiety ratio above 1:1, e.g., 2:1 stoichiometric complex, is completely formed before further decomplexing occurs. In this specification by "stable complex" is meant a stoichiometric complex stable upon dissociation as described in the preceding sentence. When an organic solvent is used to dissolve the cuprous halide salt, a complexing agent should be used which forms a complex which is at least partially insoluble in the organic solvent used to dissolve the cuprous halide salt. Suitable complexing agents contemplated herein include, but are not limited to, the following: $C_3$ to $C_{10}$ conjugated or nonconjugated, aliphatic or cyclic polyolefins, e.g., butadiene, isoprene, piperylene, allene, cyclohexadienes, octadienes, cyclooctadienes, cyclooctatetraene, cyclododecatriene; $C_2$ to $C_{10}$ aliphatic, alicyclic, or aromatic acetylenes, or acetylenes containing additional unsaturation, e.g., acetylene, methyl acetylene, propyl acetylenes, phenyl acetylenes, vinyl acetylenes, etc.; $C_2$ to $C_{10}$ or higher saturated or unsaturated aliphatic, cyclic or aromatic nitriles, e.g., acetonitrile, acrylonitrile, propiononitrile, phenylnitrile, methacrylonitrile, ethacrylonitrile, etc. The preferred organic complexing agent is butadiene. It is also within the purview of this invention to employ fluid (gaseous or liquid) streams containing the above-mentioned complexing compounds diluted with an inert vehicle (gas or liquid) or natural petroleum streams, e.g., butadiene diluted with butenes and butanes, butadiene diluted with nitrogen, methane, etc. Any of these dilute streams containing the above-mentioned complexing agents can be used as long as the diluent does not adversely affect the formation and precipitation of the desired cuprous halide complex.

As noted above, inorganic solvents can less preferably be used to dissolve the cuprous halide salts. For example, the cuprous halide salt can be dissolved in a concentrated acid, i.e., concentrated hydrochloric acid; and the butadiene can then be bubbled into the HCl solution of cuprous halide salt, thereby forming an acid soluble cuprous halide-butadiene complex. This soluble complex can then be precipitated by adding an anti-solvent, e.g., water, thereto. The precipitated complex can then be collected and washed with ether to remove water prior to coating and decomplexation thereof.

When employing butadiene as the complexing agent, the complexing is usually conducted at temperatures from −40 to 20° F. by passing the butadiene into the previously clarified cuprous halide solution. The butadiene is usually added at a rate of about 0.1 to 1.0 gram per hour per gram of dissolved cuprous halide salt. The butadiene, either in gaseous or liquid form, is added over a sufficient period of time to allow for complex formation (usually about 1 to 4 hours and more preferably 1.5 to 3 hours). The precipitated complex can then be passed as a slurry to a suitable deliquefying device such as a centrifuge, hydro cyclone, etc., while the temperature of the slurry is usually maintained at about −40 to 20° F.

P  The cuprous halide salt which can be employed herein includes cuprous chloride, cuprous bromide, and cuprous iodide. Generally, it is advisable to use a cuprous halide salt having a purity of 90+ percent, i.e., a salt which has a cuprous halide weight concentration of 90+ wt. percent; but cuprous halide salts having lower purities can be tolerated. Usually, the purity of the cuprous halide salt ranges from 95 to 100%, and preferably from 99 to 100%. The cuprous halide should be fairly dry, i.e., contain less than 1.0 wt. percent moisture at the time it is dissolved in the suitable hydrocarbon solvent. Generally its moisture content should not exceed 0.5 wt. percent, and more usually not exceed about 0.3 wt. percent, and more preferably not exceed about 0.1 wt. percent.

The previously complexed precipitated cuprous halide-butadiene complex solid particles can be coated by slurrying these particles with solvent solutions or dispersions of the selected coating polymer. Usually the solvent is removed using a rotary film evaporator, and the coated sorbent particles are usually dried in a vacuum oven for a sufficient period of time to accomplish decomplexation of the cuprous halide sorbent particles and simultaneous curing of the resin at temperatures which can range from slightly in excess of room temperature up to about 200° F. Usually the temperatures employed for simultaneous decomplexation and curing range from about 90 to 180° F., and preferably range from about 100 to about 150° F. The heating step to accomplish the simultaneous decomplexation-curing can be done at atmospheric pressure or in vacuo. When vacuum drying is employed, preferably vacuums of 5 to 29 inches of mercury can be used, although lower and higher vacuums can be used. According to a preferred embodiment of this invention, the complexed particles are coated, and then the carrier (solvent or dispersion medium) is removed, e.g. by flash evaporation. Then the cure of the polymer film is initiated, e.g. by exposure to air. The deliquidized, coated complexed particles are then graded to produce particles within the fluidizable range, viz., an average size of 30 to 200 microns and preferably about 50 to 200 microns, e.g. by sieving. Then the fluidizable particles are heated in an oven to complete the curing of the polymer film while conducting decomplexing simultaneously therewith. Most of the curing of the polymeric-film occurs in this latter step.

During decomplexing (activation) the cuprous halide particles release the complexing ligand, e.g. butadiene, which creates pores as it leaves the cuprous halide particles. These pores then serve as networks to sorb and therefore separate diolefins from hydrocarbon streams containing them with the diolefin, e.g. butadiene remaining on the sorbent while the remaining hydrocarbon components pass therethrough. Moreover, the departing complexing ligand (as it leaves the cuprous halide particles during the activation step creates communicating pores in the solid cuprous halide and the polymeric film, these pores communicating along common axes of porosity (which axes of porosity can follow random tortuous paths). The activated cuprous halide sorbent, per se, has a porosity of at least 10 percent (of the total volume of a particle) 550 to 10,000 A. pores as determined by mercury porosimeter measurements. The average pore size of the communicating pores in the film can vary considerably and can be smaller than, approximately the same size as, or larger than the pores of the solid cuprous halide sorbent depending upon the viscosity of the curable (or curing) film, film thickness, etc. According to a preferred embodiment of this invention at least 50 percent of the pores in the polymeric film communicate with exterior surface pores in the sorbent along common axes of porosity.

In accordance with this invention, it has been observed that these coated activated cuprous halide sorbents prepared in accordance with this invention can remove essentially all, e.g., 95+ percent and more, of the butadiene present in hydrocarbon streams containing butadiene in concentrations ranging as low as about 15 wt. percent (based upon total hydrocarbon stream) and below. Of course, these coated cuprous halide sorbents likewise can be employed to selectively sorb and therefore remove butadiene and other complexing ligands from hydrocarbon streams containing less than 15 wt. percent or in excess of 80 wt. percent thereof. Moreover, these coated, active cuprous halide sorbents can be used to sorb other compounds containing ligands capable of complexing therewith, e.g., ammonia; carbon monoxide; HCN; $C_2$ to $C_{20}$ monoolefins, e.g. ethylene; $C_3$ to $C_{20}$ diolefins, e.g. allene; $C_4$ to $C_{20}$ conjugated diolefins, e.g. isoprene, etc.; or other ligand-containing compounds from mixtures containing them.

The olefin recovery (desorption) procedure, whereby the selectively sorbed olefin is removed from the coated cuprous halide sorbent, can be conducted conveniently in accordance with the conventional procedures, for example, as follows: The coated, complexed cuprous halide sorbent is stripped free of enclosed gases, preferably employing a portion of the olefin being recovered as a stripping gas, at temperatures ranging from about 100–150° F., although lower or higher temperatures can be used. The loaded and stripped sorbent is subjected during the desorption step to conditions of temperature and pressure such that the dissociation pressure of the complex which has been sorbed on the coated cuprous halide sorbent exceeds the partial pressure of the sorbed olefin. Consequently, the complex decomposes with release of the sorbed olefin, which is then recovered by conventional means.

This invention will be illustrated in greater detail by the examples which follow:

EXAMPLE I

Samples of a butadiene-cuprous chloride complex, previously made by precipitation from a clear cuprous chloride-isobutylene solution by bubbling gaseous butadiene therein at a butadiene addition rate such that 1.6 times the theoretical amount of butadiene needed to precipitate the cuprous chloride present is added in a two-hour period were slurried with hydrocarbon solutions of the polymers noted below in Table 1. The solvent was removed using a rotary film evaporator, and the coated sorbents were placed in a vacuum oven overnight at 140° F. and 26 inches of mercury vacuum. The resulting material was broken up by sieving through a 420 micron sieve as a final step in the preparation thereof. The attrition resistance of the various prepared sorbents is indicated in Table 1, below.

TABLE 1

| CuCl sorbent | Polymer film [1] | Deposited from soln. containing wt. percent polymer in solution | Wt. percent polymer on sorbent (based on sorbent) | Percent of fines (lost/hour) |
| --- | --- | --- | --- | --- |
| (A) Uncoated | | | | 13.3 |
| (B) Coated | Oxidized Polybutadiene-Nitrocellulose Lacquer in Methyl Isobutyl Ketone Solvent. | 3 | 3 | 4.3 |
| (C) | do | 1 | 1 | 14.2 |
| (D) Coated | "Sylkyd 50" in Toluene [2] | 8 | 5 | 4.8 |

[1] The thickness of the cured polymer films on coated sorbents (B), (C), and (D) ranged from 20 to 100 A. The average thickness of the polymeric film on coated cuprous chloride sorbents (B) and (D) was 60 to 100 A, and the polymeric film on (C) had a thickness of approximately 20 A. Attrition resistance was determined using the standard "Roller C" test. The lower the attrition resistance value is, the higher is the resistance to attrition.

[2] "Sylkyd 50" is dimethyl tripehnyl trimethoxy trisiloxane having an average molecular weight of 470, a combining weight of 155 and is polymerized and cured through methoxy condensations. It has the structural formula:

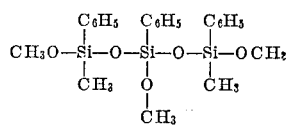

EXAMPLE II

The complex produced as in Example I was coated as follows: 200 grams of the above complex were slurried with a solution of 4 grams of an oxidized polybutadiene-styrene "Buton 300"—nitrocellulose lacquer dissolved in 600 grams of methyl isobutyl ketone. The ketone solvent was evaporated, and the sorbent preparation completed in accordance with the procedure of Example I. Then the attrition resistance of uncoated and coated cuprous chloride sorbents was determined in accordance with the standard "Roller B" attrition resistance test wherein the reported values indicate the wt. percent of fines lost per hour.

The capacity of the uncoated and coated sorbents for sorbing selectively butadiene from a $C_4$ hydrocarbon stream containing 41 wt. percent butadiene was likewise determined. The sorptive capacity values indicate the percent of theoretical sorption which was obtained.

TABLE 2

| Test | Uncoated sorbent | Coated sorbent |
| --- | --- | --- |
| "Roller B" attrition (wt. percent/hr.) | 2.9 | 0.86 |
| Sorptive capacity for butadiene (percent of theory) | 75 | 58 |

EXAMPLE III

A portion of the complex prepared according to Example I was coated as follows: 200 grams of this complex were slurried with a solution of 6 grams of polyurethane lacquer (linseed oil modified with tolylene diisocyanate) dissolved in 200 grams of n-pentane. The solvent was evaporated, and the cuprous chloride sorbent preparation finished in accordance with the procedure of Example I. The attrition resistance "Roller B" and sorptive capacity for butadiene of the coated and uncoated cuprous chloride sorbents prepared from the same complex were determined and are tabulated below in Table 3.

TABLE 3

| Test | Uncoated sorbent | Coated sorbent |
| --- | --- | --- |
| Attrition resistance (wt. percent per hour) | 2.9 | 0.1 |
| Sorptive capacity for butadiene (percent of theory) | 75 | 56 |

EXAMPLE IV 200 grams of the solid complex of Example I were charged to a fluidization unit. A coating solution prepared by dissolving 6 grams of the polyurethane lacquer of Example III in 100 ml. of n-hexane was dropepd on the fluidized solids (cuprous chloride-butadiene complex) at a rate of 300 cc. per hour at room temperature. The fluidizing gas was nitrogen. The temperature of the fluidized bed was raised to 120° F. and held at that temperature for 2 hours while fluidization with nitrogen was continued. The "Roller B" attrition resistance of this coated cuprous chloride sorbent was 0.61 wt. percent fines lost per hour compared to an attrition resistance of 2.9 wt. percent fines lost per hour for the same cuprous chloride sorbent only uncoated.

EXAMPLE V

Comparative testing was conducted using cuprous chloride sorbents uncoated, and coated with a 30 A. thick polyurethane polymer film of Example III for more than 100 hours over more than 60 sorption-desorption cycles. The polyurethane coated cuprous chloride sorbent was prepared in accordance with the procedure given in Example III above. The sorbents were placed in fluidized beds using a $C_4$ hydrocarbon feed containing 41% butadiene as the fluidizing gas in the sorption cycle and nitrogen in the desorption cycle, and the sorption and desorption cycles were conducted continuously at temperatures of 35° F. and 170° F. respectively. These sorbents were tested for attrition resistance and sorptive capacity for butadiene, the latter test being run both as freshly prepared and after the below indicated time periods and cycles had been placed on these respective cuprous chloride sorbents. The test results are tabulated hereinbelow in Table 4.

TABLE 4

| CuCl Sorbent | Attrition resistance [1] (wt. percent fines lost/day) | Sorptive capacity (percent of theo.) | |
| --- | --- | --- | --- |
| | After 100+ hours and 60+ cycles | Initial (as freshly prepared) | After 60+ cycles |
| Uncoated | 0.132 after 144 hrs. (68 cycles) | 74 | 56 (68 Cycles) |
| Polyurethane Coated | 0.006 after 136 hrs. (65 cycles) | 74 | 50 (65 Cycles) |

[1] On unit attrition resistance.

While the present invention has been illustrated hereinabove, especially with regard to polybutadiene and polyurethane lacquers; polysiloxane and other polymer coatings can be used to deposit the corresponding polymeric films on the precomplexed cuprous chloride sorbents. Moreover in place of polymer solutions, solutions of polymerizable monomers can be used as coating materials, e.g., various functional (unsaturated) silanes including alkyl substituted, halogenated or unhalogenated unsaturated silane monomers, e.g., allyl dimethyl chlorosilane, allyl methyl dichlorosilane, allyl trichlorosilane, hexamethyldithioazane, etc. can be used. These silane materials readily form cured polymer films having the requisite properties by heating them at temperatures up to 200° F., thereby achieving simultaneous decomplexation (activation) of the cuprous chloride sorbents upon which they are coated, and formation (polymerization) and curing of the siloxane polymer films formed from these silanes.

What is claimed is:

1. An active sorbent comprising readily fluidizable filmed particles of activated, porous, solid cuprous halide sorbent having an average particle size ranging from about 30 to 200 microns having thereon from about 0.5 to about 30 wt. percent based on cuprous halide of a solid, porous, cured polymeric film comprised of a polymer curable below approximately 200° F. wherein the pores of said film communicate with the pores of said active cuprous halide along common axes of porosity, said cured polymeric film having an average thickness ranging from about 10 to 600 A. and the resistance to attrition of said filmed particles being greater than that of active, solid, porous cuprous halide particles, per se.

2. An active sorbent as in claim 1 wherein the average thickness of said cured, porous polymeric film ranges from about 20 to 400 A. and said filmed sorbent contains from 1.5 to 20 wt. percent of said polymeric film based on cuprous halide.

3. An active sorbent as in claim 1 wherein said cuprous halide is cuprous chloride.

4. An active sorbent as in claim 1 wherein said active cuprous halide particles have a porosity of above about 10% (of the total volume of a particle) 550 to 10,000 A. pores.

5. An active sorbent as in claim 1 wherein said polymeric film contains a polybutadiene polymer.

6. An active sorbent as in claim 1 wherein said polymeric film contains a polyurethane polymer.

7. An active sorbent as in claim 1 wherein said polymeric film contains a polysiloxane polymer.

8. A method of selectively sorbing ligands capable of sorption by active cuprous halide sorbent from streams containing them which comprises contacting said ligand containing stream with the polymeric filmed active cuprous halide sorbent particles of claim 1.

9. A method as in claim 8 wherein said polymeric filmed active cuprous halide sorbent particles are in fluidized bed form.

10. A method as in claim 9 wherein said cuprous halide is cuprous chloride.

References Cited

UNITED STATES PATENTS 3,340,004   9/1967   Hunter et al. _____ 260—681.5
3,348,908   10/1967   Long et. al. _____ 23—97

REUBEN FRIEDMAN, *Primary Examiner.*

C. N. HART, *Assistant Examiner.*